United States Patent
Giroux et al.

(10) Patent No.: US 9,621,375 B2
(45) Date of Patent: Apr. 11, 2017

(54) SMART ETHERNET EDGE NETWORKING SYSTEM

(75) Inventors: Natalie Giroux, Ottawa (CA); Ken Young, Kanata (CA); Brian Smith, Ottawa (CA); Chris Barrett, Nepean (CA); Pablo Frank, Ottawa (CA)

(73) Assignee: Ciena Corporation, Hanover, MD (US)

( * ) Notice: Subject to any disclaimer, the term of this patent is extended or adjusted under 35 U.S.C. 154(b) by 2152 days.

(21) Appl. No.: 11/519,503

(22) Filed: Sep. 12, 2006

(65) Prior Publication Data

US 2008/0062876 A1    Mar. 13, 2008

(51) Int. Cl.
| H04L 1/00 | (2006.01) |
| H04L 12/54 | (2013.01) |
| H04L 12/28 | (2006.01) |
| H04L 1/20 | (2006.01) |

(52) U.S. Cl.
CPC .......... *H04L 12/5695* (2013.01); *H04L 1/205* (2013.01); *H04L 12/2856* (2013.01)

(58) Field of Classification Search
CPC ....... H04W 28/02; H04W 28/10–28/14; H04L 43/026; H04L 47/00; H04L 47/10–47/13; H04L 47/70–47/829; H04L 12/569; H04L 12/5695; H04L 2012/445
USPC ......... 370/470–471, 476, 477, 474, 229–240
See application file for complete search history.

(56) References Cited

U.S. PATENT DOCUMENTS

| 3,584,145 A * | 6/1971 | Cutler et al. ............. 375/240.14 |
| 5,859,837 A | 1/1999 | Crayford |
| 6,505,253 B1 * | 1/2003 | Chiu ................... H04L 12/1868 370/229 |
| 6,904,286 B1 | 6/2005 | Dantu |
| 7,266,080 B1 * | 9/2007 | Dispensa et al. ............. 370/230 |
| 7,613,126 B1 * | 11/2009 | Natarajan et al. ............ 370/252 |
| 2002/0065865 A1 * | 5/2002 | Gilbert ......................... 709/102 |
| 2002/0141427 A1 * | 10/2002 | McAlpine .................... 370/413 |
| 2002/0181396 A1 | 12/2002 | Chen et al. |
| 2003/0058880 A1 | 3/2003 | Sarkinen et al. |
| 2003/0063560 A1 | 4/2003 | Jenq et al. |

(Continued)

FOREIGN PATENT DOCUMENTS

| EP | 1124356 A2 | 8/2001 |
| WO | WO 2004057817 A2 | 7/2004 |

OTHER PUBLICATIONS

IEEE 802 Tutorial: Congestion Notification, Jul. 17, 2006, San Diego, pp. 1-45.*

*Primary Examiner* — Andrew Chriss
*Assistant Examiner* — Kenan Cehic
(74) *Attorney, Agent, or Firm* — Clements Bernard Walker PLLC; Christopher L. Bernard; Lawrence A. Baratta, Jr.

(57) ABSTRACT

A system is provided for controlling the flow of data-packet traffic through an Ethernet telecommunications network having a multiplicity of nodes interconnected by multiple network links. Incoming data-packet traffic from multiple customer connections are received at a first node for entry into the network via the first node. Flow control messages are generated to represent the states of the first node and, optionally, one or more network nodes upstream from the first node, and these states are used as factors in controlling the rate at which the incoming packets are admitted to the network. Alternatively, the flow control messages may be used to control the rate at which packets generated by a client application are transmitted to the first node.

44 Claims, 15 Drawing Sheets

(56) References Cited

U.S. PATENT DOCUMENTS

| | | |
|---|---|---|
| 2003/0107991 A1* | 6/2003 | Tezuka et al. ............... 370/229 |
| 2003/0115355 A1* | 6/2003 | Cometto ................ H04L 47/12 |
| | | 709/234 |
| 2003/0133406 A1 | 7/2003 | Fawaz et al. |
| 2003/0147347 A1 | 8/2003 | Chen et al. |
| 2003/0156542 A1 | 8/2003 | Connor |
| 2004/0037223 A1 | 2/2004 | Harrison et al. |
| 2004/0081090 A1* | 4/2004 | Hara et al. .................. 370/229 |
| 2004/0095882 A1* | 5/2004 | Hamzah et al. ............. 370/229 |
| 2004/0120252 A1* | 6/2004 | Bowen, Jr. ............. H04L 47/10 |
| | | 370/229 |
| 2004/0151181 A1 | 8/2004 | Chu et al. |
| 2004/0156345 A1 | 8/2004 | Steer et al. |
| 2004/0170179 A1 | 9/2004 | Johansson et al. |
| 2004/0170186 A1 | 9/2004 | Shao et al. |
| 2004/0264651 A1* | 12/2004 | Urban ....................... 379/22.03 |
| 2005/0008014 A1 | 1/2005 | Mitra et al. |
| 2005/0063375 A1* | 3/2005 | Wybenga et al. ........... 370/386 |
| 2005/0063397 A1* | 3/2005 | Wu et al. .................... 370/401 |
| 2005/0141523 A1* | 6/2005 | Yeh et al. .................... 370/400 |
| 2005/0152269 A1 | 7/2005 | Liu |
| 2005/0220090 A1* | 10/2005 | Loughran ........... H04L 12/5601 |
| | | 370/386 |
| 2005/0243711 A1 | 11/2005 | Alicherry et al. |
| 2006/0092840 A1* | 5/2006 | Kwan et al. ............... 370/230.1 |
| 2006/0221820 A1* | 10/2006 | Zeitak ......................... 370/229 |
| 2006/0250986 A1* | 11/2006 | Alharbi et al. ............. 370/258 |
| 2006/0274700 A1* | 12/2006 | Janneteau et al. ........... 370/338 |
| 2007/0002741 A1* | 1/2007 | Vaananen et al. ........... 370/235 |
| 2007/0153683 A1* | 7/2007 | McAlpine ................... 370/229 |
| 2007/0263535 A1* | 11/2007 | Shabtay ...................... 370/230 |
| 2007/0268830 A1* | 11/2007 | Li et al. ...................... 370/235 |
| 2008/0112429 A1* | 5/2008 | McKinnon et al. .......... 370/442 |
| 2010/0302941 A1* | 12/2010 | Prabhakar et al. ........... 370/230 |

\* cited by examiner

SMART ETHERNET EDGE NETWORKING SYSTEM

FIELD OF THE INVENTION

The present invention generally relates to Ethernet access and, in particular, to bandwidth-efficient Ethernet grid networking systems.

BACKGROUND OF THE INVENTION

Ethernet transport is an emerging opportunity for telecommunication carriers. This service provides point-to-point Ethernet connectivity and offers different types of services with many combinations of quality objectives, such as loss, delay and bandwidth. This opportunity is created by the access network quickly becoming a bottleneck as new applications demand more and more bandwidth. Traditional access equipment using SDH and xDSL do not offer the speeds required to transport all the new multimedia applications including, for example, triple-play, Fixed-Mobile-Convergence (FMC) and IP multimedia sub-systems (IMS).

To address these access challenges, telecommunications carriers have selected Ethernet. They need to be able to deploy rapidly a wide ranging variety of services and applications without the need to constantly modify the network infrastructure. Enterprises have long used Ethernet as the technology to support a variety of applications requiring different qualities of service (QoS) from the network. Carriers are leveraging this flexibility and are standardizing on this technology to offer data access services.

Using this service definition, existing network elements which offer network access using Ethernet technology are not designed to make maximum use of the legacy network links existing at the edge of the carrier networks. Many access technologies such as DSL or WiMAX are prone to errors which affect the link speed. The network devices are unable to react to these errors to ensure that the service level agreements are met. The following inventions are focused on addressing these challenges.

Flow Control

When a telecommunications provider offers an Ethernet transport service, a service level agreement is entered with the customer which defines the parameters of the network connection. As part of this agreement, bandwidth objectives are defined in terms of Committed Information Rate (CIR) and Excess Information Rate (EIR). The CIR guarantees bandwidth to a connection while the EIR allows the connection to send at higher bandwidth when available.

The telecommunications provider verifies the traffic from each connection for conformance at the access by using a traffic admission mechanism such as policing or traffic shaping. The policing function can take action on the non-conforming packets such as lowering the priority or discarding the packets. Policing is necessary because the service provider can not rely on an end-point not under the control of the network provider to behave according to the traffic descriptor. In case of mis-behavior, the performance of the whole network can be affected. Policing does not take into account the reality of the application traffic flow and the dynamic modification encountered by a traffic flow when it is moving through the network. As packets get multiplexed and demultiplexed to and from network links, their traffic characterization is greatly modified. Another issue with policing and static characterization is that it is extremely difficult to set these traffic descriptors (i.e., CIR, EIR and burst tolerance) to match a given application requirement. The needs of the application change with time in a very dynamic and unpredictable way. Traffic shaping, in turn, buffers the incoming traffic and transmits it into the network according to the contracted rate.

To implement the Ethernet transport service in a provider's network, sufficient bandwidth is allocated assuming the connections fully use the committed bandwidth, even though that is not always the case, leading to inefficiencies. In case of excess low priority traffic, the network generally over-provisions the network in order to ensure that sufficient traffic gets through such that the application performance does not deteriorate.

Another inefficiency currently encountered in Ethernet networks is that traffic that has traveled through many nodes and has almost reached destination is treated the same as traffic just entering the network which has not consumed any resources. Current Ethernet network implementations handle congestion locally where it occurs, by discarding overflow packets. This wastes bandwidth in the network in two ways:

1. bandwidth capacity is wasted as a result of retransmission of packets by higher layer protocols (e.g., TCP)
2. Packets are lost throughout the network, wasting precious upstream bandwidth which could be used by other connections generating more revenues for the carriers.

The Ethernet protocol includes a flow control mechanism referred to as Ethernet Pause. The problem with Ethernet Pause flow control is it totally shuts off the transmission of the port rather than shaping and backing off traffic that it could handle. It is currently acceptable to do this at the edge of the network, but for a network link it would cause too much transmission loss, and overall throughput would suffer more than causing a retransmission due to dropping packets.

There is a need to define a flow control mechanism for Ethernet that alleviates the need for local handling of congestion and allows intelligent optimized throttling of source traffic. Instead of requiring that applications comply with static traffic descriptors, it would be desirable to use real time feedback such that the applications can adapt their packet transmission to match the network state, allowing for a minimum throughput to guarantee the minimum requirement for the application. Some applications implicitly derive network status using jitter buffers, for example, but all other applications have to conform to a static set of traffic descriptors which do not meet their dynamic requirements.

Flexible Shaper to Reduce Delay or Loss

A traffic admission mechanism can be implemented using a policing function or a traffic shaper. Traffic shaping has a number of benefits from both the application and the network point of view. However, the shaper can delay the transmission of a packet into the network if the traffic sent by the application is very different from the configured traffic descriptors. It would be useful to make the shaper flexible to take into account the delays that a packet encounters so that different actions, such as lowering the priority or discarding, can be applied.

Network Migration

The key to the success of any new networking technology is to ensure seamless and cost-effective migration from existing legacy networks. Carriers cannot justify replacing complete networks to deploy new services, and thus the network overhaul has to be done gradually, ideally on a pay-as-you-grow basis.

Automatic Bandwidth Renegotiation

Once a customer has entered a service level agreement ("SLA") with a carrier, this is fixed and can not easily be changed. To engineer the SLA, each customer application is required to characterize its traffic in terms of static traffic descriptors. However it is very difficult to make such characterizations without over-allocating bandwidth. For example, traffic patterns for videoconferencing, peer-to-peer communication, video streaming and multimedia sessions are very unpredictable and bursty in nature. These applications can be confined to a set of bandwidth parameters, but usually that is to the detriment of the application's performance or else it would trigger underutilization of the network. To add to this challenge, a customer's connections can carry traffic from multiple applications, and the aggregate behavior is impossible to predict. Also, the demand is dynamic since the number of new applications is growing rapidly, and their behavior is very difficult to characterize.

The demand for network resources also varies greatly depending on the time of day and the type of applications. There is a need for mechanisms to allow the applications to optimize their performance while maximizing the network usage.

Sub-Classes for Ethernet QoS

Carriers market only a limited set of Ethernet classes of service, generally three or four services covering the need for low latency/low jitter, low loss with guaranteed throughput and best effort for bursting. Given the number and varying types of applications and customers that a carrier handles, there is a need for further differentiation within a class of service to allow a carrier more flexibility in its tariff strategies.

SUMMARY OF THE INVENTION

One embodiment of the present invention provides a method of controlling the flow of data-packet traffic through an Ethernet telecommunications network having a multiplicity of nodes interconnected by multiple network links. Incoming data-packet traffic from multiple customer connections are received at a first node for entry into the network via the first node. Flow control messages are generated to represent the states of the first node and, optionally, one or more network nodes upstream from the first node, and these states are used as factors in controlling the rate at which the incoming packets are admitted to the network. Alternatively, the flow control messages may be used to control the rate at which packets generated by a client application are transmitted to the first node.

In one implementation, transit traffic is also received at the first node, from one or more other nodes of the network, and the flow control messages are used to control the rate at which the transit traffic is transmitted to the first node. The transit traffic may be assigned a higher transmission priority than the incoming traffic to be admitted to the network at the first node.

Another embodiment provides a method of controlling the entry of data-packet traffic presented by a client application to the Ethernet telecommunications network. The rate at which the incoming packets from the client application are admitted to the network is controlled with a traffic shaper that buffers incoming packets and controllably delays admission of the buffered packets into the network. The delays may be controlled at least in part by multiple thresholds representing contracted rates of transmission and delays that can be tolerated by the client application. The delays may also be controlled in part by the congestion state of the network and/or by prescribed limits on the percentage of certain types of traffic allowed in the overall traffic admitted to the network.

A further embodiment provides a method of controlling the flow of data-packet traffic in an Ethernet telecommunications network having a flow control mechanism and nodes that include legacy nodes. Loopback control messages are inserted into network paths that include the legacy nodes. Then the congestion level of the paths is determined from the control messages, and the flow control mechanism is triggered when the congestion level reaches a predetermined threshold. The control messages may be inserted only for each priority of traffic on the paths that include the legacy nodes. In one implementation, the delay in a path is determined by monitoring incoming traffic and estimating the actual link occupancy from the actual traffic flow on a link. If nodes transmitting and receiving the control messages have clocks that are not synchronized, the congestion level may be estimated by the delay in the path traversed by a control message, determined as the relative delay using the clocks of the nodes transmitting and receiving the control messages.

Another embodiment provides a method of automatically renegotiating the contracted bandwidth of a client application presenting a flow of data-packet traffic to an Ethernet telecommunications network. The actual bandwidth requirement of the client application is assessed on the basis of the actual flow of data-packet traffic to the network from the client application. Then the actual bandwidth requirement is compared with the contracted bandwidth for the client application, and the customer is informed of an actual bandwidth requirement that exceeds the contracted bandwidth for the client application, to determine whether the customer wishes to increase the contracted bandwidth. If the customer's answer is affirmative, the contracted bandwidth is increased. In one implementation, the contracted bandwidth corresponds to a prescribed quality of service, and the contracted bandwidth is increased or decreased by changing the contracted quality of service.

Yet another embodiment provides different sub-classes of service within a prescribed class of service in an Ethernet telecommunications network by setting different levels of loss or delay for different customer connections having a common contracted class of service, receiving incoming data-packet traffic from multiple customer connections and transmitting the traffic through the network to designated destinations, generating flow control messages representing the states of network nodes through which the traffic flows for each connection, and using the flow control messages to control the data-packet flow in different connections at different rates corresponding to the different levels of loss or delay set for the different connections. In specific implementations, the different rates vary with prescribed traffic descriptors (such as contracted CIR and EIR) and/or with preset parameters. The connections in which the flow rates are controlled may be selected randomly, preferably with a weight that is preset or proportional to a contracted rate.

BRIEF DESCRIPTION OF THE DRAWINGS

The invention will be better understood from the following description of preferred embodiments together with reference to the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

As was previously discussed, Ethernet transport services provide point-to-point connections. The attributes of this service are defined using a SLA which may define delay, jitter and loss objectives along with a bandwidth commitment which must be achieved by the telecommunication provider's network.

One option to implement this service is to leverage a connection-oriented protocol across the access network. Several standard options can be used to implement this connection:
  MPLS
  PWE over MPLS
  802.1 ah Provider Bridge Transport
  L2TP
  PWE over L2TP
  VPLS
All these technologies offer transparent transport over an access or core network.

Figure 1:
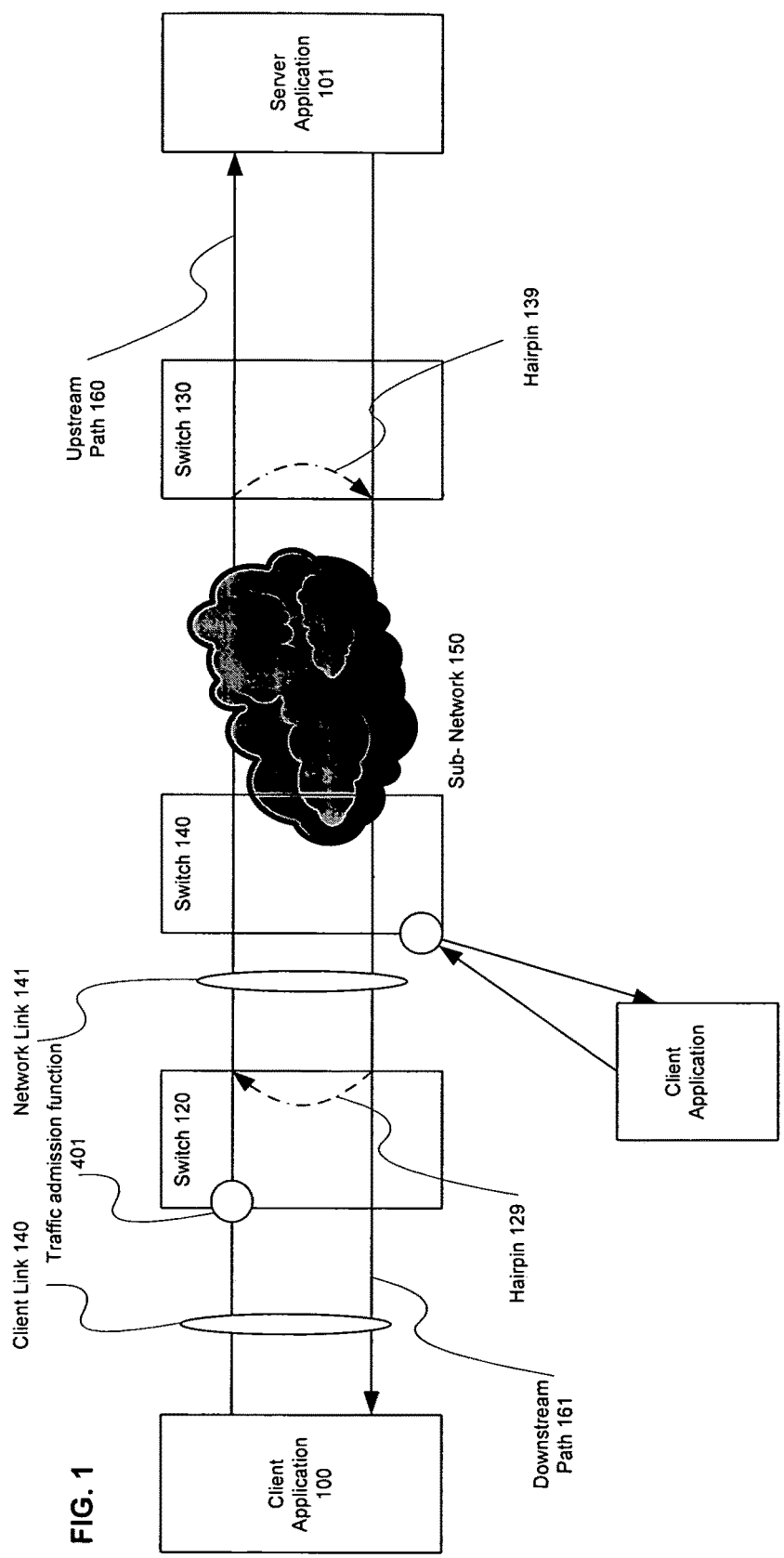
FIG. 1 is a diagram of an Ethernet transport service connection.

FIG. 1 illustrates the key attributes of an Ethernet transport service. The telecommunications provider establishes a path between a client application 100 and a server 101. The upstream path 160 carries packets from the client application 100 to the server application 101 via switch 120, switch 140, sub-network 150 and switch 130. Switch 120 is the edge switch for the client application 100. It is the entry point to the network. Switch 140 is a transit switch for the client application 100. The downstream path 161 carries packets from the server 101 to the client 100 via the switch 130, sub-network 150, switch 140 and switch 120. By definition, these paths take the same route in the upstream and downstream directions. As well, the switches 120 and 130 create an association between the upstream and downstream paths called hairpin connections 129 and 130 or "hairpins." These hairpins are used for control messaging.

Figure 2:
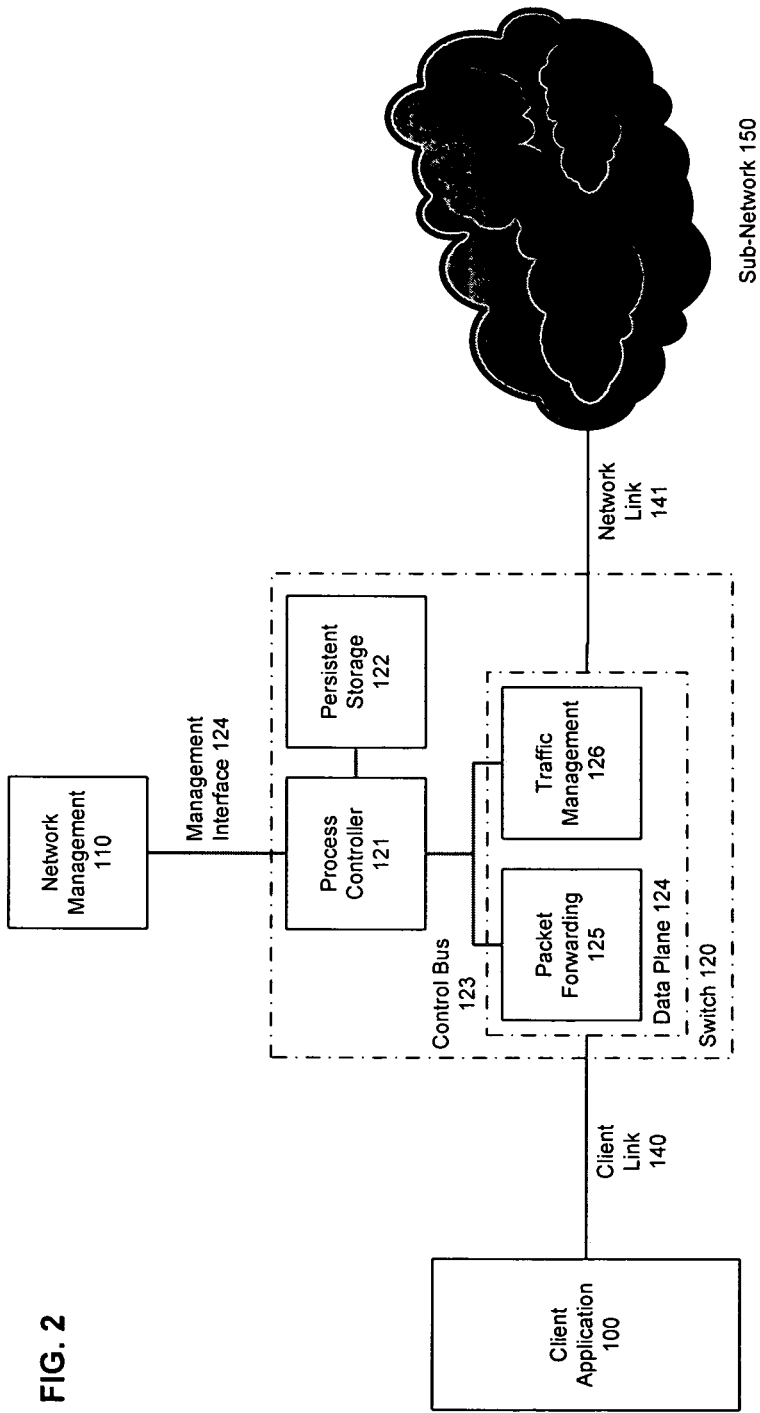
FIG. 2 is a diagram of an Ethernet transport service switch.

FIG. 2 illustrates the elements required in the switch 120 to provide ethernet transport services. The switch 120 contains a process controller 121 which controls the behavior of the switch. All the static behavior (e.g., connection classification data and VLAN provisioning) is stored in a persistent storage 122 to ensure that the switch 120 can restore its behavior after a catastrophic failure. The switch 120 connects the client application 100 to a sub-network 150 via data plane 124. Client packets are received on a client link 140 and passed to a packet forwarding engine 125. Based upon the forwarding policy (e.g., VLAN 5 on port 3 is forwarded on MPLS interface 5 using label 60) downloaded from the process controller 121 from the persistent storage 122 via control bus 123, the client application 100 data is forwarded to the network link 141. The rate at which the client application data is passed to the sub-network 150 is controlled by a traffic management block 126. The behavior of the switch 120 can be changed over time by a management application 110 over a management interface 124 to add, modify or delete Ethernet transport services or to change policies. These changes are stored in the persistent storage 122 and downloaded to the data plane 124.

Flow Control

To enforce the SLA between the customer and the telecommunications provider, a traffic admission mechanism 401 (see FIG. 1) is required. Referring to FIG. 2, the traffic admission mechanism monitors the traffic on the client link 140. To perform this function, the switch 120 classifies all the traffic in its packet forwarding engine 125 and passes this to the traffic management block 126. The traffic management block 126 manages all the queues and the scheduling for the network link 141.

Figure 3:
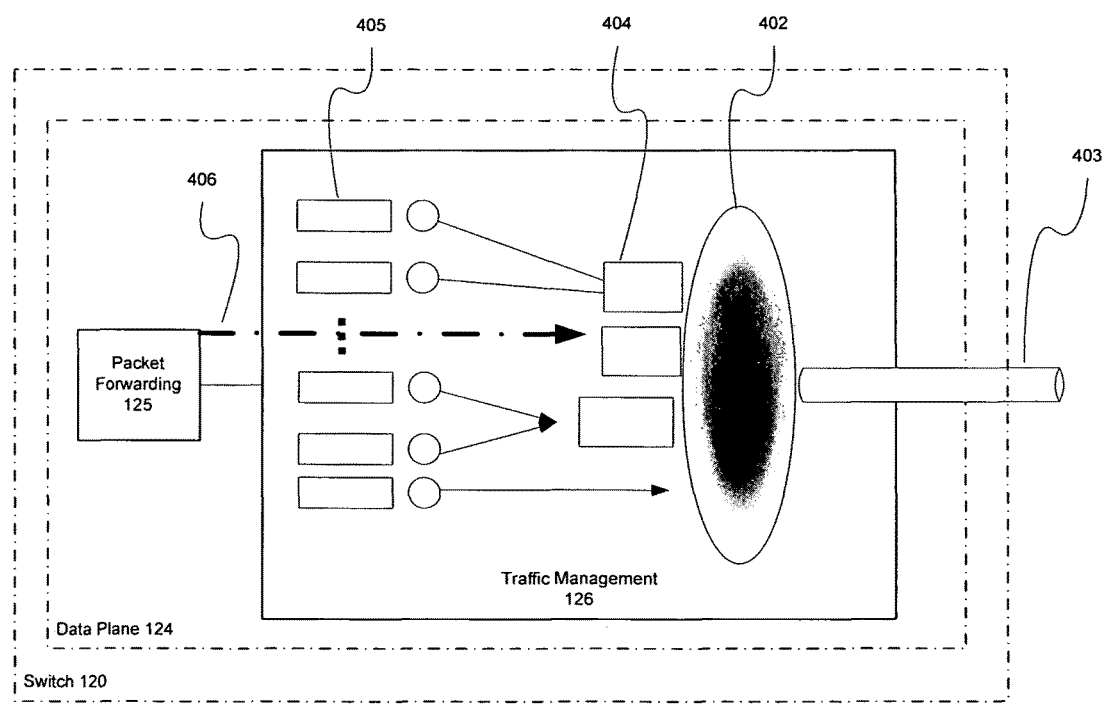
FIG. 3 is a diagram of an logical view of the traffic management bloc.

One implementation is shown in FIG. 3. Once a customer's traffic is classified, it is monitored using either a classic policing function or a traffic shaper in the traffic admission mechanism 401 (FIG. 1). The advantage of using a traffic shaper at the edge instead of a policing function is that it smoothes the traffic sent by the client application to make it conforming to the specified traffic descriptors, making the system more adaptive to the application need. The traffic shaper is included in the nodes, and is therefore under the control of the network provider which can rely on its behavior. In case of a traffic shaper used for traffic admission, per-customer queues 405 are provided and are located where the traffic for a connection is admitted to the network.

A scheduler 402 (FIG. 3) is responsible for selecting which packet to transmit next from any of the connections that are ready to send on the outgoing link 403 (NNI, UNI or Trunk). Each outgoing link 403 requires a scheduler 402 that is designed to prioritize traffic. The prioritization takes into account the different CoS and QoS supported such that delay and jitter requirements are met. Furthermore, the scheduler 402 treats traffic that is entering the network at that node with lower priority than transit traffic 406 that has already gone over a link, since the transit traffic has already consumed network resources, while still ensuring fairness at the network level. There exist several different types of schedulers capable of prioritizing traffic. However, the additional ability to know which traffic is entering the network at a given node is particularly useful, given the connection-oriented centrally managed view of the system. The scheduler 402 can queue the traffic from each connection separately or combine traffic of multiple connections within a single intermediate queue 404.

Multiple intermediate queues 404 can be used to store packets that are awaiting transmission on the link. At this point in switch 120, traffic is aggregated, and the rate at which traffic arrives at the queuing point may exceed the rate at which it can leave the queuing point. When this occurs, the intermediate queues 404 can monitor their states and provide feedback to the traffic admission mechanism 401.

Figure 4:
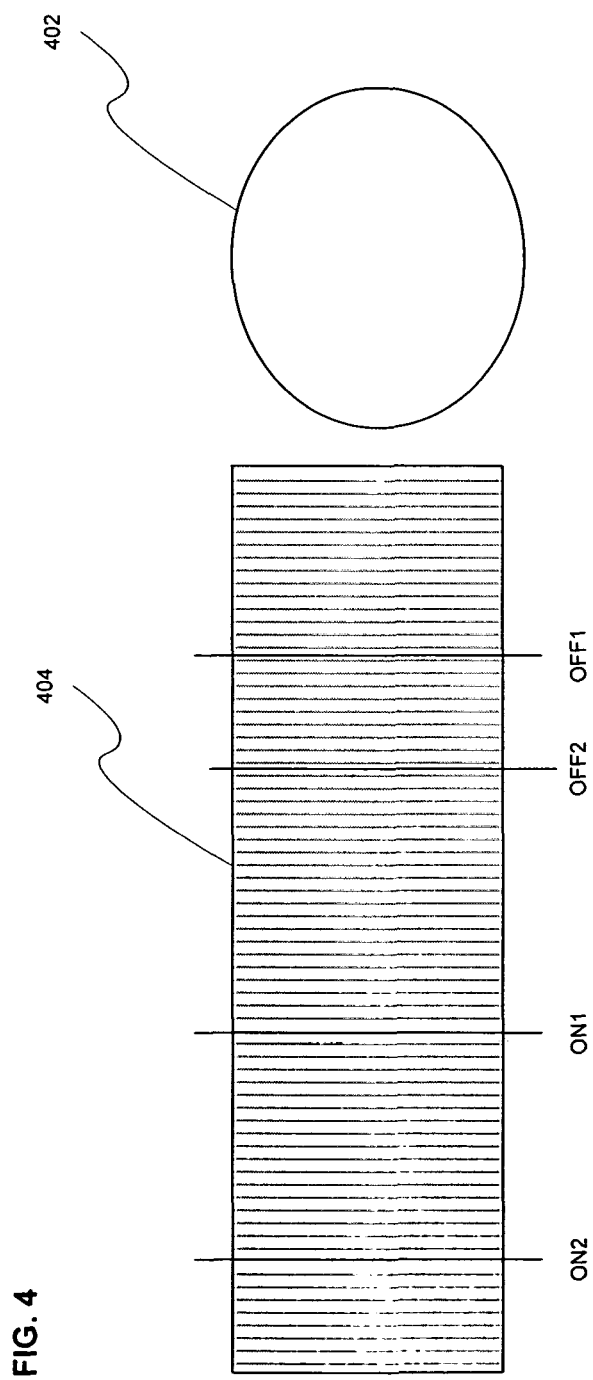
FIG. 4 is a diagram of an example of a threshold-based flow control mechanism.

FIG. 4 shows an example of how the queue state is monitored. For each queue, multiple sets of ON/OFF thresholds are configured. When the queue size reaches the ON1 threshold, a flow control message indicating that this level has been reached is sent to the traffic admission function for this connection. The state is stored for this connection to avoid continuous flow of control messages to this connection. For each subsequent packet passed to this queue, if the queue state of the connection does not match the local queue state, a flow control message is transmitted back to its traffic admission function, and its local queue state is updated.

Flow control messages are very small and are sent at the highest priority on the hairpin of the connection. The probability of losing a backward flow control message while the forward path is active is very low. Flow control messages are only sent to indicate different levels of congestion, providing information about the state of a given queuing point.

When a message is received by the traffic admission mechanism 401, it reduces the rate at which the customer's traffic is admitted to the network. In general, this is accomplished by reducing the rate of EIR traffic admitted. For a policing function, more traffic is discarded at the ingress client link 140 (FIG. 2). For a traffic shaper, packets are transmitted to the network at a reduced rate.

If an intermediate queue 404 continues to grow beyond the ON2 threshold, another message is sent, and the traffic admission mechanism further reduces the customers EIR. When the queue size is reduced to below the OFF2 level, a control message is sent to indicate that this level is cleared, and the traffic admission mechanism starts to slowly ramp up. More thresholds allow for a more granular control of the traffic shapers, but can lead to more control traffic on the network. Different threshold combinations can be used for different types of traffic (non-real-time vs. real-time). One simplistic implementation of this technique is to generate control messages when packets are being discarded for a given connection, because the queue overflowed or some congestion control mechanism has triggered it.

The response of the traffic admission mechanism to a flow control message is engineered based on the technique used to generate the message. In the case where queue size threshold crossing is used, as described above, the traffic admission mechanism steps down the transmission rate each time an ON message is received, and steps up the transmission rate each time an OFF message is received. The size of the steps can be engineered. For example, the step down can be exponential while the step up is linear. The step can also be proportional to the traffic descriptors to ensure fairness. The system slowly oscillates between the increase and decrease of the rates until some applications need less bandwidth. If the number of connections using the flow controlled queue is available to each traffic admission mechanism, the steps can be modified accordingly. With a larger number of connections, a smaller step is required since more connections are responsive to the flow control.

In order for the flow control mechanism to work end-to-end, it may be applied to all queuing points existing in the path. That is, the flow control mechanism is applied to all points where packets are queued and congestion is possible, unless non-participating nodes are handled using the network migration technique described below.

Figure 5:
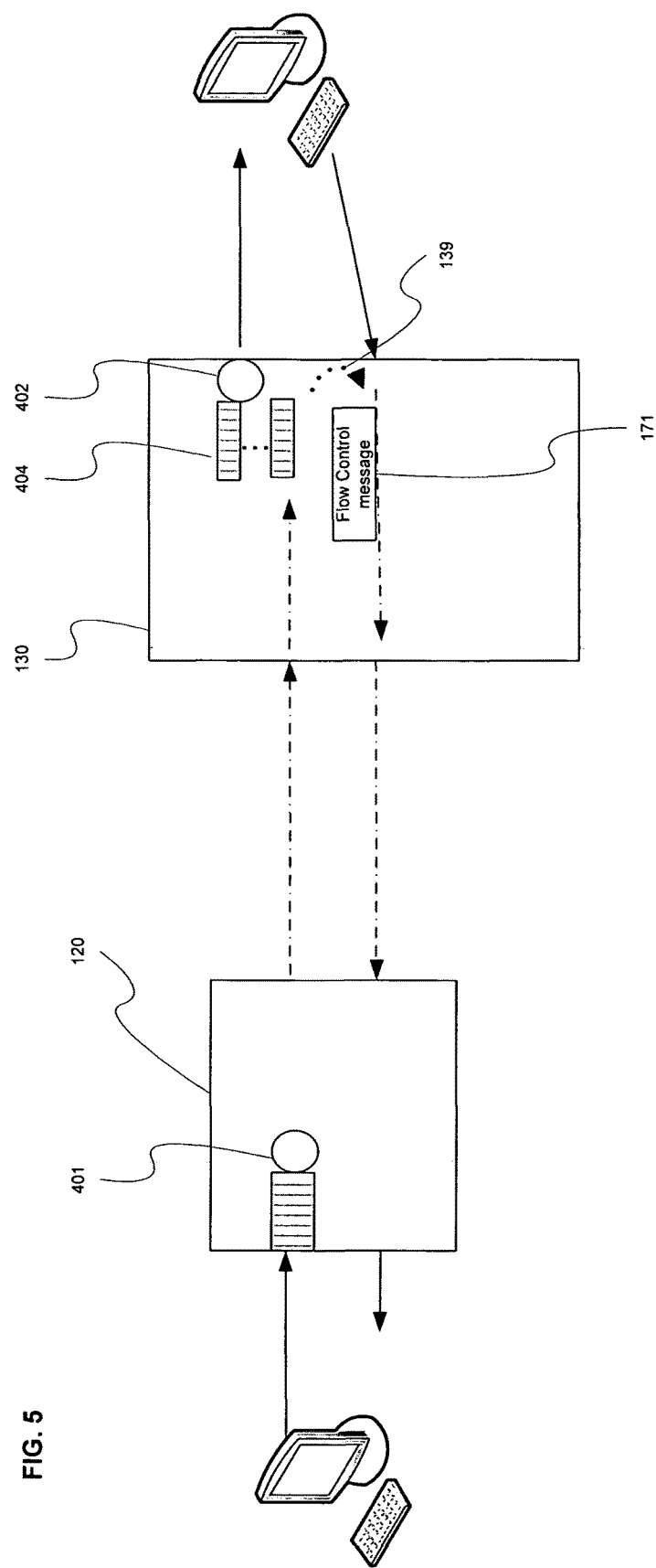
FIG. 5 is a diagram of an example of flow control elements

FIG. 5 illustrates the flow control mechanism described above. Flow control messages 171 from a queuing point 404 in a switch 130 in the path of a connection are created when different congestion levels are reached and relieved. The flow control message 171 is conveyed to the connection's traffic admission mechanism 401 which is located where the connection's traffic enters the network. The control messages 171 can be sent directly in the backward path of the connection using a hairpin 139 (as described above). This method minimizes the delay before the flow control information reaches the traffic admission mechanism 401. The quicker the flow control information reaches the traffic admission mechanism 401, the more efficient is the control loop.

If multiple queues in the path are sending flow control messages, the traffic admission mechanism 401 keeps all the information, but responds to the most congested state. For example, when one node notifies an OFF2 level, and another node is at OFF3, the traffic admission mechanism adjusts to the OFF3 level until an ON3 is received. If an ON1 is received for that node before the other node which was at OFF2 level has sent an ON2, then the traffic shaper remains at OFF2.

Figure 6:
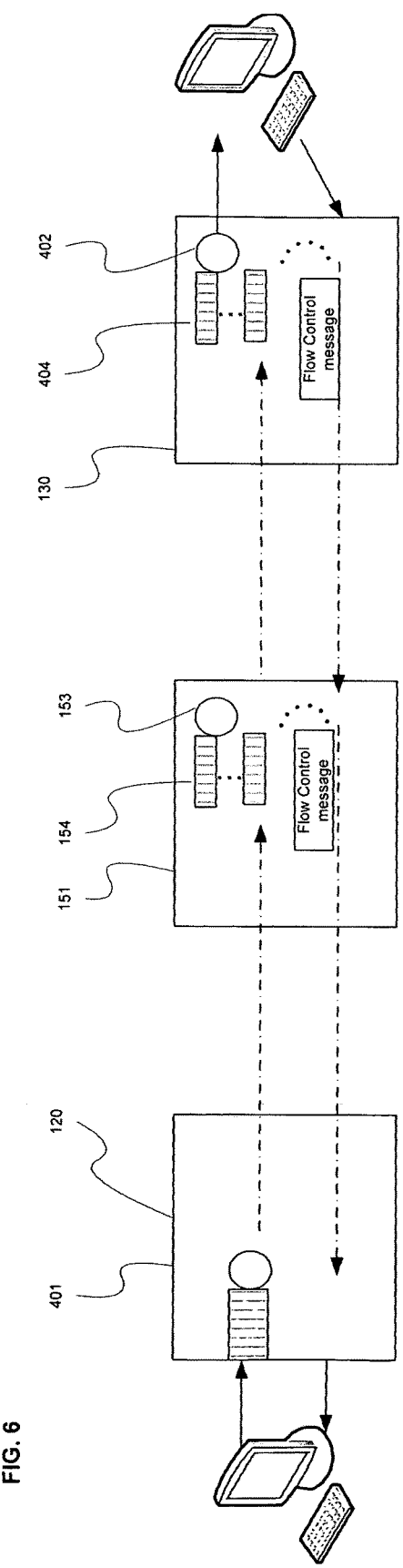
FIG. 6 is a diagram of an example of flow control handling at interim nodes

Alternatively, each interim node can aggregate the state of its upstream queue states and announce the aggregate state queue downstream. FIG. 6 depicts an example of this implementation. Each connection using an intermediate queue 154 or 404 maintains a local queue state and a remote queue state. If a queue 404 reaches the ON1 threshold, a flow control message is generated and sent downstream to the traffic admission mechanism 401. When a switch 151 receives the flow control message, it updates the remote congestion state for the customer connection. If the local state of the connection is less than the remote connection state, the flow control message is forwarded to the traffic admission mechanism 401. Subsequently, if the intermediate queue 154 should enter the ON2 state, the local connection state is higher than the remote connection state. As a result, an additional flow control message is communicated downstream.

To clear the reported thresholds, both queues need to clear their congestion state. In the example using FIG. 6, if an intermediate queue 404 reaches OFF1, a flow control message is generated to indicate the new queue state. The switch 150 receives the flow control message and clears the remote queue state for the customer connection. However, a flow control message is not generated upstream since the local queue state is in the ON2 state. When the local queue state changes, such as reaching OFF2, a flow control message is generated and sent to the traffic admission mechanism 401 which affects the shaping rate.

Other methods can be used to generate the flow control. For example, instead of actual queue sizes, the rate at which the queue grows can be used to evaluate the need for flow control. If the growth rate is beyond a predetermined rate, then a flow control message indicating the growth rate is sent to the traffic admission mechanism 401. When the growth rate is reduced below another predetermined rate, then another message indicating a reduction in the rate is sent to the traffic admission mechanism 401. Again, multiple thresholds can be configured to create a more granular control loop. But the number of thresholds is directly proportional to the amount of traffic consumed by the control loop.

Another technique consists of having each queuing point calculate how much traffic each connection should be sending and periodically send control messages to the traffic shapers to adjust to the required amount. This technique is more precise and allows better network utilization, but it requires per-connection information at each queuing point, which can be expensive or difficult to scale.

When a new connection is established, there are different ways it can join the flow control. One approach is to have the traffic admission mechanism start at its minimum rate (CIR) and slowly attempt to increase the transmission rate until it reaches the EIR or until it receives a flow control message, at which point it continues to operate according to the flow control protocol. Another more aggressive approach is to start the rate at the EIR and wait until a congestion control message is received to reduce the rate to the required by the flow control protocol level. A third approach consists of starting to send at the CIR and have the nodes programmed to send the actual link state when it first detects that a connection is transmitting data. Each approach generates different behavior in terms of speed of convergence to the fair share of the available bandwidth.

Optionally, the queuing point can include the number of connections sharing this queue when the flow control is triggered, which can help the traffic shaper establish a more optimal shaping rate.

Optionally, the traffic admission mechanism can extend the flow control loop in FIG. 6 by conveying the status, e.g., using an API, of the shaper to the upper-layer application either in real-time or periodically such that an application can be design to optimized its flow based on the network status. Even if the reaction of the application cannot be trusted by the network, the information can be used to avoid loss at the traffic shaper, preventing the resending of packets and therefore optimizing the network end-to-end.

The robust flow control mechanism meets several objectives, including:

Minimize packet loss in the network during congestion, thus not wasting network resources, i.e., once a packet enters the network, it should reach the destination.

Minimize the amount of control messages used and how much bandwidth they use. When there is no congestion, no control messages should be required.

Minimize the delay for the control messages to reach the traffic shaper.

Ensure that there is no interference between the flow control information sent by different nodes.

Maximize utilization of bandwidth, i.e., ensure that the traffic shaper can increase the rates as soon as congestion is alleviated.

Resilience to the loss of control messages.

Isolation of connections in case of mis-behavior (failure of shaper).

Fairness among all connections, where fairness definition can be implemented in a variety of modes.

Keep the per-connection intelligence and the complexity at the edge and minimize the per-connection information required at each queuing point.

Flexible Shaper to Reduce Delay or Loss

When a traffic shaper is used as the traffic admission mechanism, delay can be added to packets at the network edge. A flexible traffic shaping algorithm can take delay into account when transmitting the packets into the network to ensure that SLA delay budgets are not violated.

Figure 7:
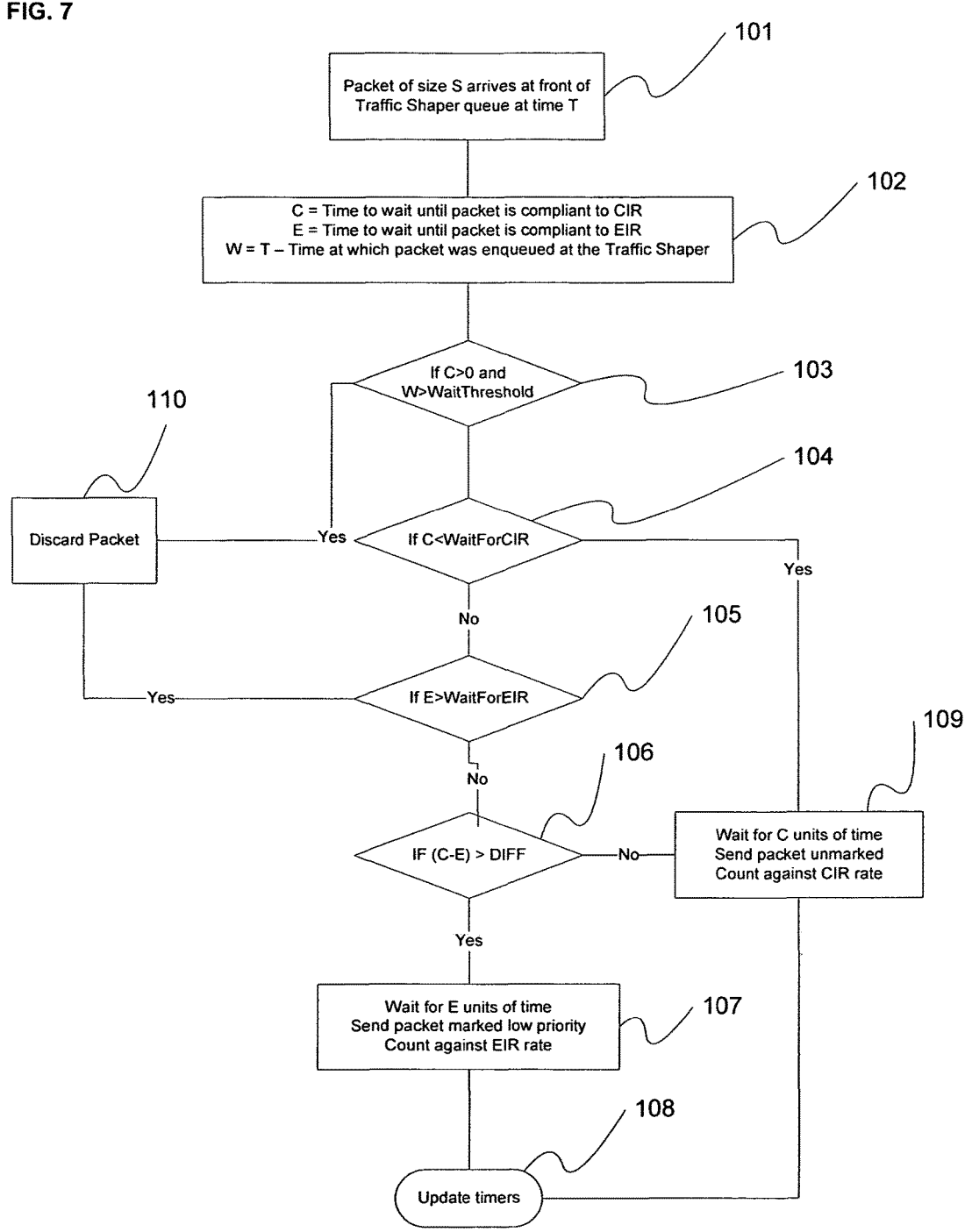
FIG. 7 is a diagram of one implementation of a flexible shaper mechanism.

An example of such a flexible traffic shaper algorithm is shown in FIG. 7. In this example, the function is triggered when each packet reaches the front of a shaper queue 101. At this point the time to wait before that packet would conform to CIR and EIR is calculated at 102, in variables C and E, respectively. There are several known methods to perform these calculations. If there is time to wait until the packet conforms to CIR but the packet has already been queued for longer than a predetermined WaitThreshold, determined at 103, then the packet is discarded at 110 as it is deemed no longer useful for the client application. If C is lower than a predetermined threshold WaitForCIR, determined at 104, then the shaper waits and sends the packet unmarked at 109. Otherwise, if E is greater than another predetermined threshold WaitForEIR, determined at 105, then the packet is discarded at 110. If the difference in wait time between compliance to CIR and EIR is less than another predetermined threshold DIFF, determined at 106, then the packet is sent as CIR after a delay of C at 109. Otherwise the packet is sent, marked low priority, after a delay of EIR at 107. In either case, once the packet is transmitted, the shaper timers are updated at 108.

The settings of these thresholds can enable or disable the different behaviors of the algorithm. Also, the setting of the threshold impacts the average delay for the packets to get through the shapers and the amount of marked packets sent into the network.

The shaper can respond to flow control messages as described above (FIG. 5), but the algorithm shown still applies except that the actual sending of the message might be delayed further depending on the rate at which the shaper is allowed to send by the network.

Furthermore, the traffic shaper can perform different congestion control actions depending upon the type of traffic that it is serving. For example, a deep packet inspection device could be placed upstream from the traffic shaper and use different traffic shapers for different types of traffic sent on a connection. For TCP/IP type traffic, the traffic shaper could perform head-of-the-line drop to more quickly notify the application that there is congestion in the network. Other types of congestion controls such as Random Early Discard could be applied for other types of traffic as configured by the operator. Another configuration could limit the overall amount of Ethernet multicast/broadcast traffic admitted by the traffic shaper. For example, the shaper could only allow 10% broadcast and 30% multicast traffic on a particular customer's connection over a pre-defined period.

Network Migration

Figure 8:
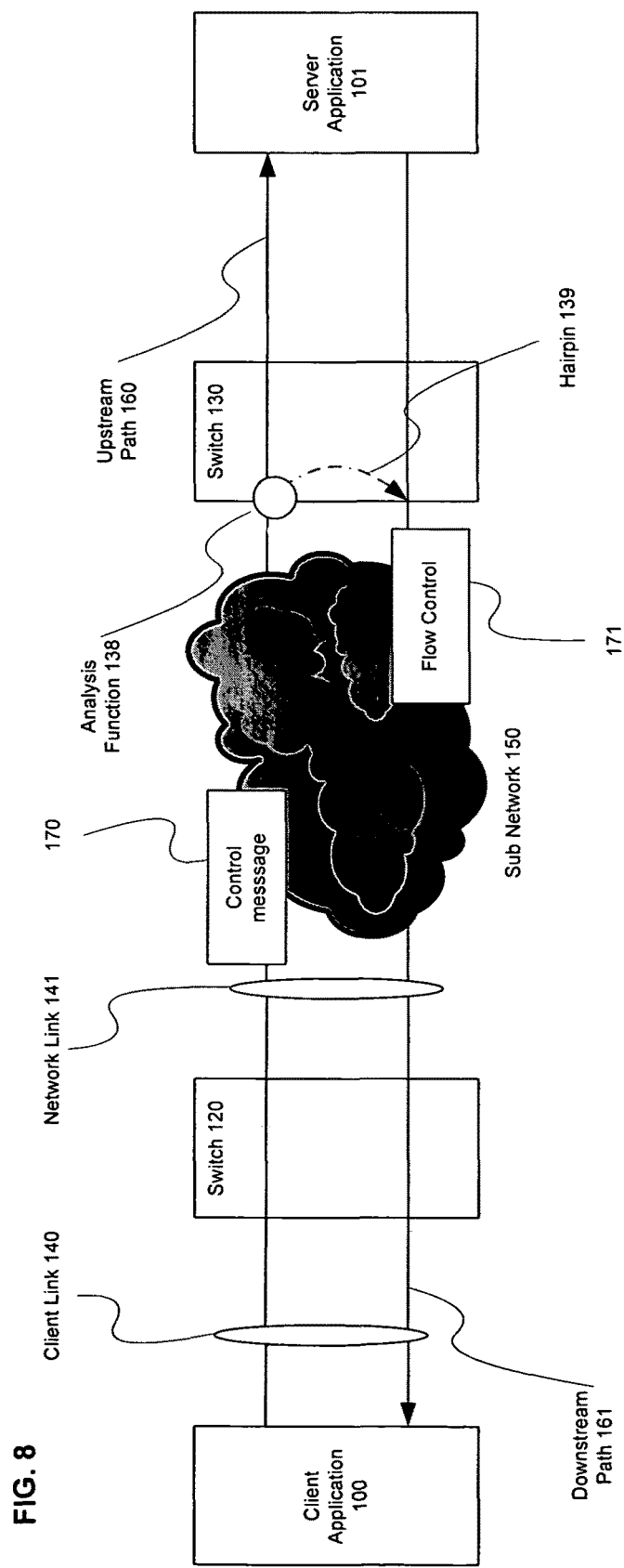
FIG. 8 is a diagram of the use of control messages to estimate the behavior of non-participating elements.

Network migration is a critical consideration when using systems that include an end-to-end flow control protocol into an existing network. The flow control protocol must operate, even sub-optimally, if legacy (or non-participating) nodes in the sub-network 150 are included in the path (see FIG. 8).

The path across the sub-network 150 can be established in a number of ways depending on the technology deployed. The path can be established statically using a VLAN, an MPLS LSP or a GRE tunnel via a network management element. The path can also be established dynamically using RSVP-TE or LDP protocol in an MPLS network, SIP protocol in an IP network or PPPoE protocol in an Ethernet Network.

Another approach is to multiplex paths into a tunnel which reserves an aggregate bandwidth across a sub-network 150. For example, if the network is MPLS, a MPLS-TE tunnel can be established using RSVP-TE. If the network is IP, a L2TP connection can be created between the switches 120 and 130. The paths are mapped into L2TP sessions. If the network is Ethernet, a VLAN can be reserved to connect traffic between switches 120 and 130. Then paths can use Q-in-Q tagging over this VLAN to transport traffic through the sub-network 150.

Once switches 120 and 130 have established a path upstream (160) and downstream (161), switch 130 uses its hairpin 139 to determine the behavior of that path and estimate the congestion level and failures. To estimate the behavior of the upstream path 160, switch 120 inserts a periodic timestamped control message 170 in the path being characterized. The control message is set at the same priority as the traffic. The switch 120 does not need to insert control messages for each connection going from the downstream to the upstream node, only one for each priority of traffic.

When the upstream node receives the message, an analysis function 138 calculates different metrics based on the timestamp. The analysis function can calculate various metrics and combine them to estimate the level of congestion, including, for example:

Delay in the path for control message i, i.e., $D_i$=(Current time$_i$–timestamp$_i$)

Rolling average delay using different averaging periods (hours, days, months) to smooth out the jitter in the statistics.

Minimum and maximum values obtained in a given time period.

Jitter in the delay (by calculating the variance of the delay measurements).

The actual traffic flow on the link to estimate the actual link occupancy.

Figure 9:
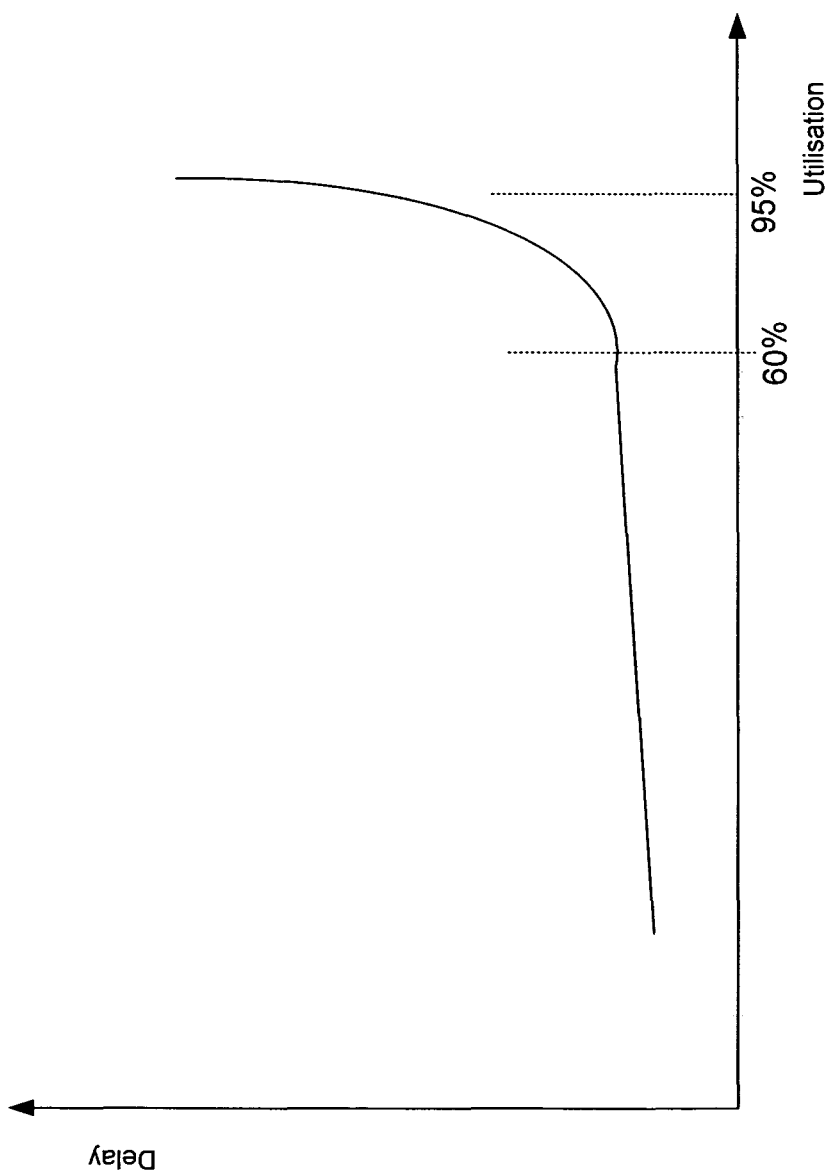
FIG. 9 is a diagram of a typical delay curve as a function of utilization.

The analysis function can also estimate the average growth in the delay to estimate the growth of the delay curve, such as:

$$\Delta D_i = D_i - D_{i-1}$$

which provides an estimate as to when the non-participating elements are reaching the knee of the curve (FIG. 9).

The analysis function can also keep a history of delay and loss measurements based on different time of day periods. For example during work day time, the network may be generally more loaded but congestion would occur more slowly, and in the evening the load on the network is lighter, but congestion (e.g., due to simultaneous downloads) will be immediate and more severe.

Based on these metrics, the analysis function 138 estimates congestion on the sub-network 150 assuming that the packet delay follows the usual trend as a function of network utilization, as shown in FIG. 9. Using this assumption, delays through a network which exceeds approximately 60-70% utilization rise sharply. The analysis function can estimate when the sub-network 150 reaches different levels of utilization.

If the analysis function 138 determines that the upstream path is becoming congested, the switch 130 generates an indication to switch 120, using a protocol consistent with the flow control implemented in the participating node. It can then trigger flow control notifications to the source end-point by sending a high priority flow control message 171 in the downstream path 161, as per the flow control description above.

Ideally, to calculate accurate delay measurements, both nodes 120 and 130 need to have synchronized clocks, such that the timestamp provided by the upstream node 120 can be compared to the clock of the downstream node 130. If this capability is not available, the clocks from the upstream and downstream nodes can be used and only a relative delay value is measured. That is sufficient to estimate possible congestion or delay growth in the non-participating element. Another technique is for the downstream node to look at the time it is expecting messages (e.g., if they are sent every 100 msec.) and compare that to the time it is actually receiving the messages. That also provides estimates on the delay, jitter and delay growth through the non-participating element. The drift in clocks from both nodes is insignificant compared to the delay growth encountered in congestion.

This information can be used even for:

non-delay-sensitive connections as it allows estimating the congestion in the non-participating elements.

for delay-sensitive connections, the information can be used to trigger a reroute to a backup path when the QoS is violated.

The analysis function is set up when the path is created. If the path is statically provisioned, this policy is provided to the switch 130 using the management interface. If the path is dynamically established, this policy may be signaled in-band with the path-establishment messages.

If the analysis function detects that periodic control messages are no longer received, it can indicate to the source via control messages that the path in the non-participating element has failed. This mechanism is particularly useful when the path across subnetwork 150 is statically provisioned.

Sequence numbers can be added to the control message 170 so that the analysis function can detect that some of the control messages are lost. The analysis function can then also estimate the loss probability on the path and take more aggressive flow control or protection switching actions in order to alleviate/minimize the loss.

Using such techniques, flow-controlled network elements can be deployed on a pay-as-you-grow basis around existing network nodes.

Automatic Bandwidth Renegotiation

Once a network has migrated to provide end-to-end flow control, the network provides the ability to assess an application's bandwidth requirement dynamically. Depending on the types of customers, service providers can leverage data available from the traffic shapers to enable new revenue streams.

Figure 10:
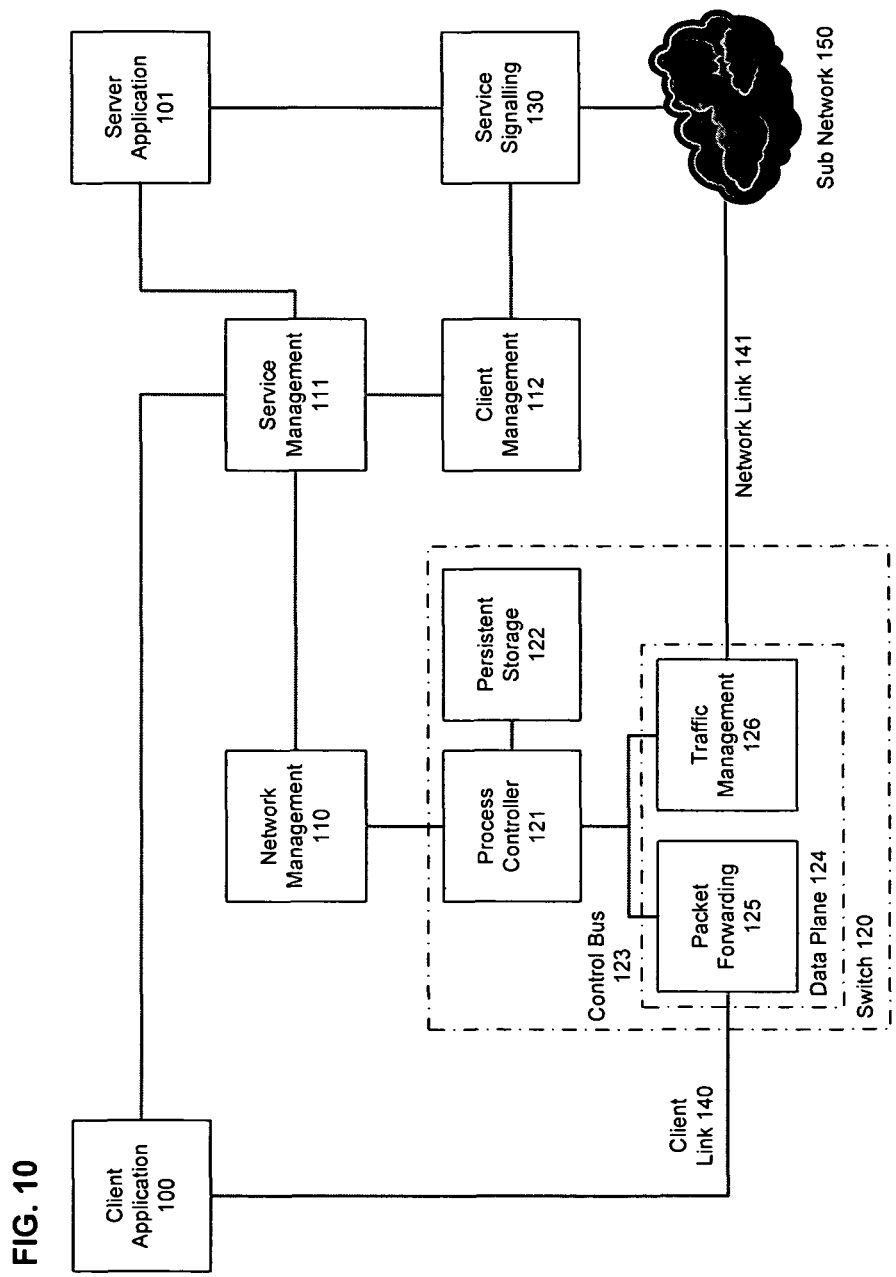
FIG. 10 is a diagram of the elements that can be involved in a bandwidth renegotiation process.

A system which leverages the end-to-end flow control elements is shown in FIG. 10. This figure contains the elements required to establish a service between a client application 100 and a server application 101. Examples of these applications are:

1. A VoIP phone connecting to a registrar or proxy server via SIP.
2. A video set top box registering with a video middleware server via HTTP.
3. A PC connecting to the Internet via PPPoE or DHCP.

The client application 100 connects to an access network 150 through a switch 120, which operates as described above. A network management element 110 oversees all the switches in the sub-network 150. It provides an abstraction layer for higher-level management elements to simplify the provisioning and maintenance of services implemented in the access network.

Access to the server application 101 is controlled by a service signaling element 130 and a client management system 112. The service signaling element 130 processes requests from the client application 100. It confers with the client management system 112 to ensure that the client application 100 can access the server application 101. The client management system 112 can also initiate a billing record (i.e., a CDR) as these events occur.

The service management system 111 oversees network and customer management systems 110 and 112 to provision and maintain new services. Both need to be updated to allow a new client to access the server application 101.

Figure 11:
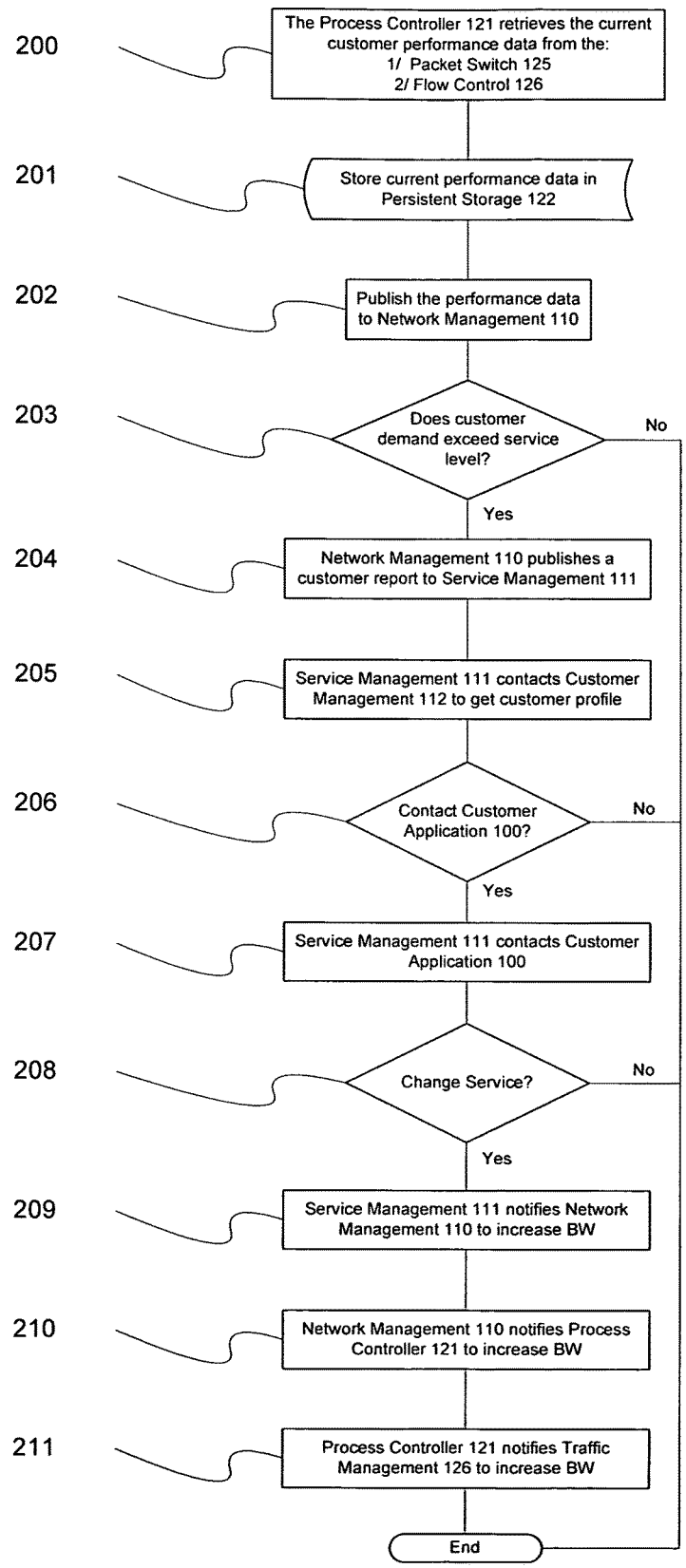
FIG. 11 is a diagram of one implementation of a bandwidth renegotiation mechanism.

One method to leverage flow control is for the service management system 111 to be notified when a particular client's service demands continually exceed or underrun the service level agreement between the client and the service provider. One possible method to implement this is depicted in FIG. 11, which leverages the network definitions of FIG. 10.

In this case, a process controller 121 polls the data plane 124 for client application 100 statistics at 200. These statistics are stored for future reference at 201 and passed to the network management system 110 at 202. If the customer's demand exceeds the current service level agreement 203, the network management system 110 informs the service management system 111 204. The service management system 111 contacts the client management system 112 205. If customer management decides to contact the client application 100 206, the service management element 111 contacts the customer at 207. If the customer decides to change the service level agreement at 208, the service management element 111 contacts the network management system 110 to increase the bandwidth at 209. The network management system 110 changes the bandwidth profile for the customer and informs the process controller 121 in the switch 120 at 210. The process controller 121 changes the provisioning of the customer in the traffic management element 126 at 211.

Information provided by the traffic shaper 126 (or 401 in FIG. 5) can include, for example:

Average delay for packets in the traffic shaper queue.

Average delay for each packet when reaching the front of the shaper queue (to indicate how far off the application's traffic pattern in from the traffic descriptors)

% of time packets are dropped at the tail of the traffic shaper, queue.

% of time packets are marked by the traffic shaper, if applicable.

% of time packets are dropped at the head of the traffic shaper, if applicable.

Average number of packets waiting for transmission in the traffic shaper.

The above information can be manipulated in different types of averaging periods and is sufficient to evaluate whether a connection's traffic descriptors match the applications' requirements for a given time period. The information can also be used to figure out time-of-day and time-of-year usage patterns to optimize the network utilization.

Figure 12:
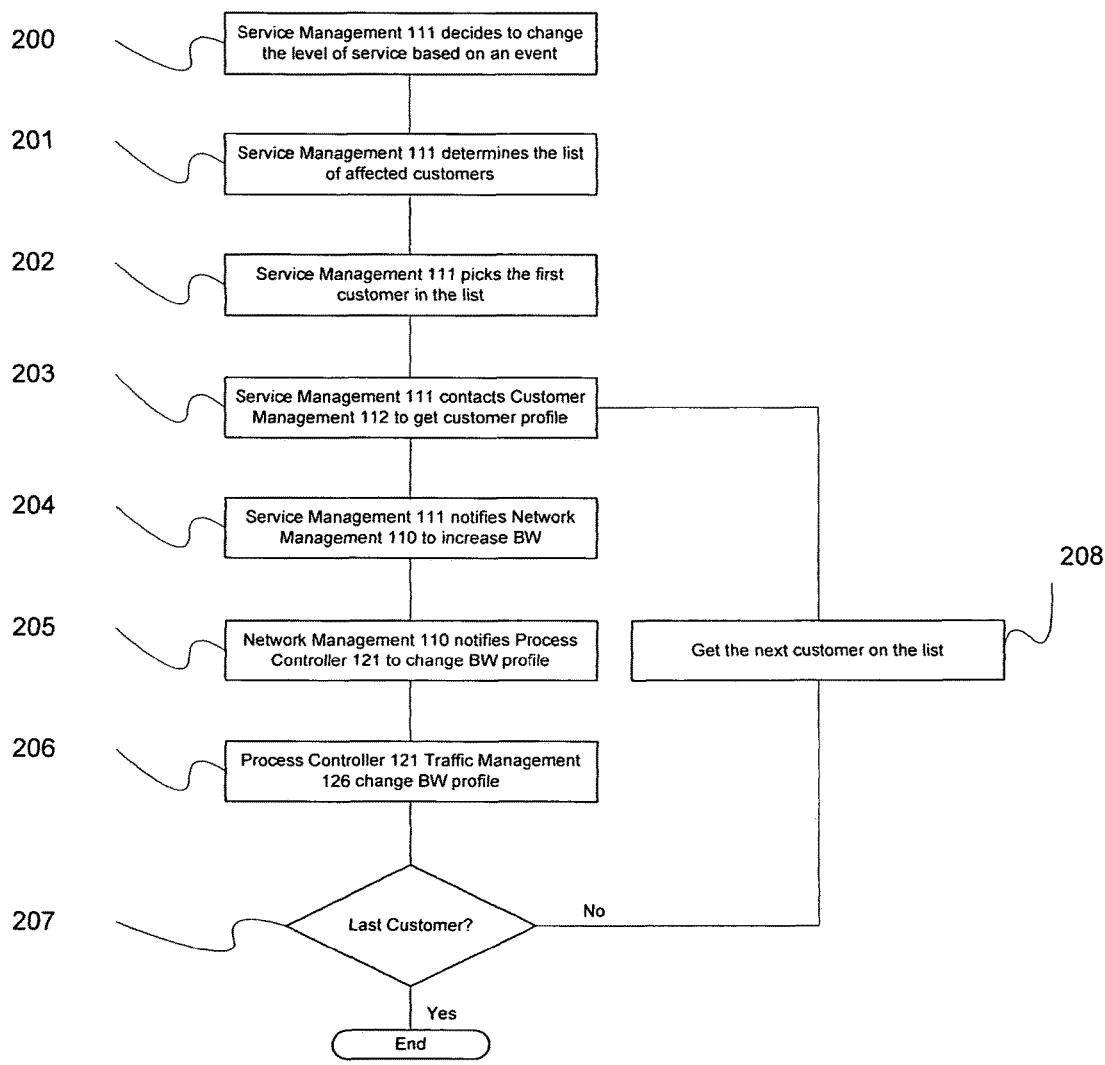
FIG. 12 is a diagram of one implementation of a bandwidth renegotiation mechanism.

The per-client statistics and the server application usage statistics can be aggregated to provide usage patterns by the service management system to create "Time-of-Day" and "Time-of-the-Year" patterns. These patterns can be used to "re-engineer" a network on demand to better handle the ongoing service demand patterns. One possible method to implement this is depicted in FIG. 12.

In this case, the service management system 111 decides to change the level of service for a set of customers at 200 and 201. For each customer in the list, the service management system 111 contacts the client management system 112 to retrieve the customer profile at 203. The service management system 111 programs the changes into network management at 204 which is passed to the process controller 121 at 205. The process controller 121 changes the provisioning of the customer in traffic management 126 at 206. This process is repeated at 207 and 208 until all customers have been updated.

Figure 13:
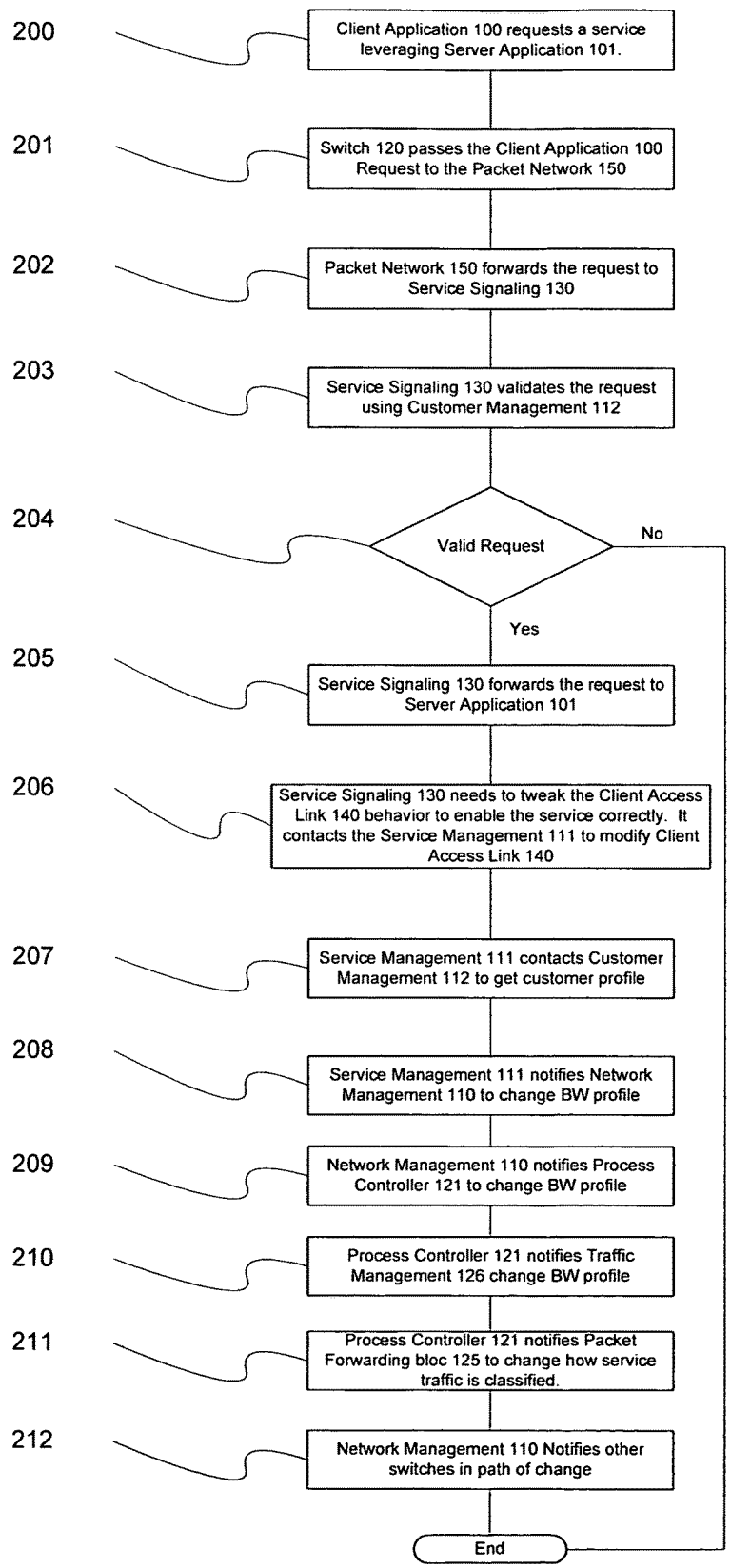
FIG. 13 is a diagram of one implementation of a bandwidth renegotiation mechanism.

For some applications, it is desirable to perform these changes in real-time and allow the changes to persist for a limited period of time. An example of an application of this nature is "on-line" gaming. The client requires a low bandwidth with low delay connection-type to the server application. When the client logs into the server, the service signaling engine can tweak the access network to classify and provide the correct QoS treatment for this gaming traffic. One method to implement this is depicted in FIG. 13.

The client application 100 initiates a service to the service application 101 at 200. The switch 120 passes this request through the packet network 150 to the signaling server 130 at 201 and 202. To validate the client's permissions, the service signaling element 130 validates the request using the client management system 112 at 203 204. Assuming the request is valid, the service request is passed to the server application 101 at 205. Based upon the service, the server application 101 decides to tweak the customers profile and contacts the service management system 111 to modify the client access link 140 at 206. The service management system 111 contacts the client management system 112 to retrieve the customer profile at 207 and programs the changes into the network management at 208. The change is passed to the process controller 121 at 209, which changes the provisioning of the customer in traffic management 126 at 210, and the classification of the customer's traffic in the packet forwarding block at 211. Network management also adjusts all other switches in the packet access network 150 to ensure smooth service at 212.

An alternative to handling these QoS changes in real-time is to allow the process controller 121 to participate in the service signaling path between the client application 100 and the server application 101. The service provider could create a logical network (i.e., a VLAN) to handle a particular application. Examples for these on-demand applications are:

1. VoIP signaled using SIP. The service provider can map this to a high priority/low latency path.

Figure 14:
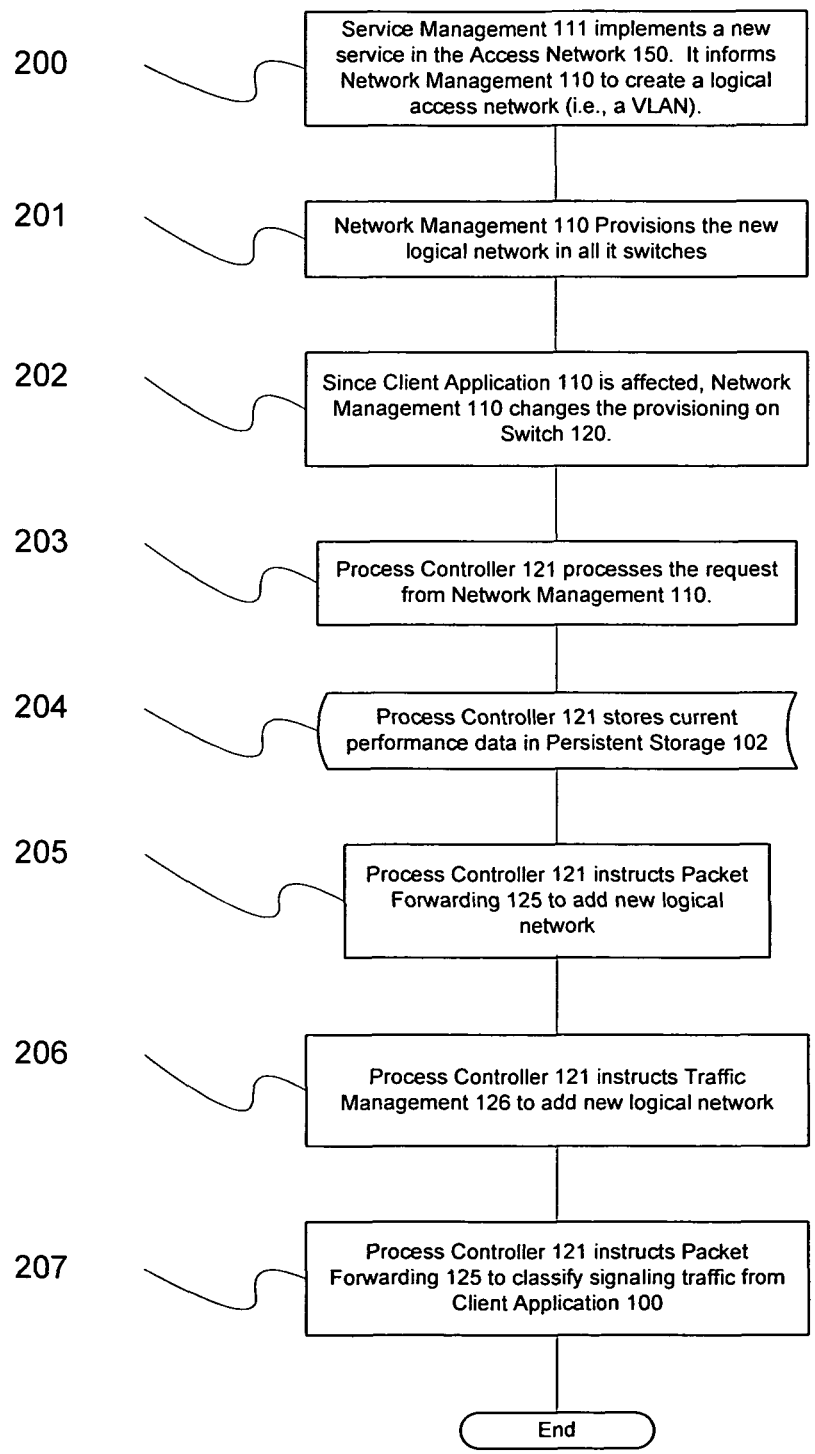
FIG. 14 is a diagram of one implementation of a bandwidth renegotiation with a logical network.

2. Peer-to-Peer protocols using the bit torrent protocol. The service provider can map this to a best-effort service. Based upon this traffic classification, the service management system 111 can provision this logical network in the access network 150. One possible method to implement this is depicted in FIG. 14.

In this case, the service management system 111 decides to create, and instructs the network management system 110 to implement, a new virtual LAN at 200. The network management system determines which customers are affected, and the switches require the new virtual LAN at 201. Since the client application 100 is affected, the switch 120 is modified to apply the new LAN at 202. The change is passed to the process controller 121 at 203 and stored in persistent storage to ensure the behavior can be restored across reboots at 204. Then the changes are provisioned in traffic management 126 at 206, and the packet forwarding block at 205 and 206. To completely enable the service, the process controller changes the classification of the customer's traffic in the packet forwarding block at 211 to add the new virtual LAN.

Figure 15:
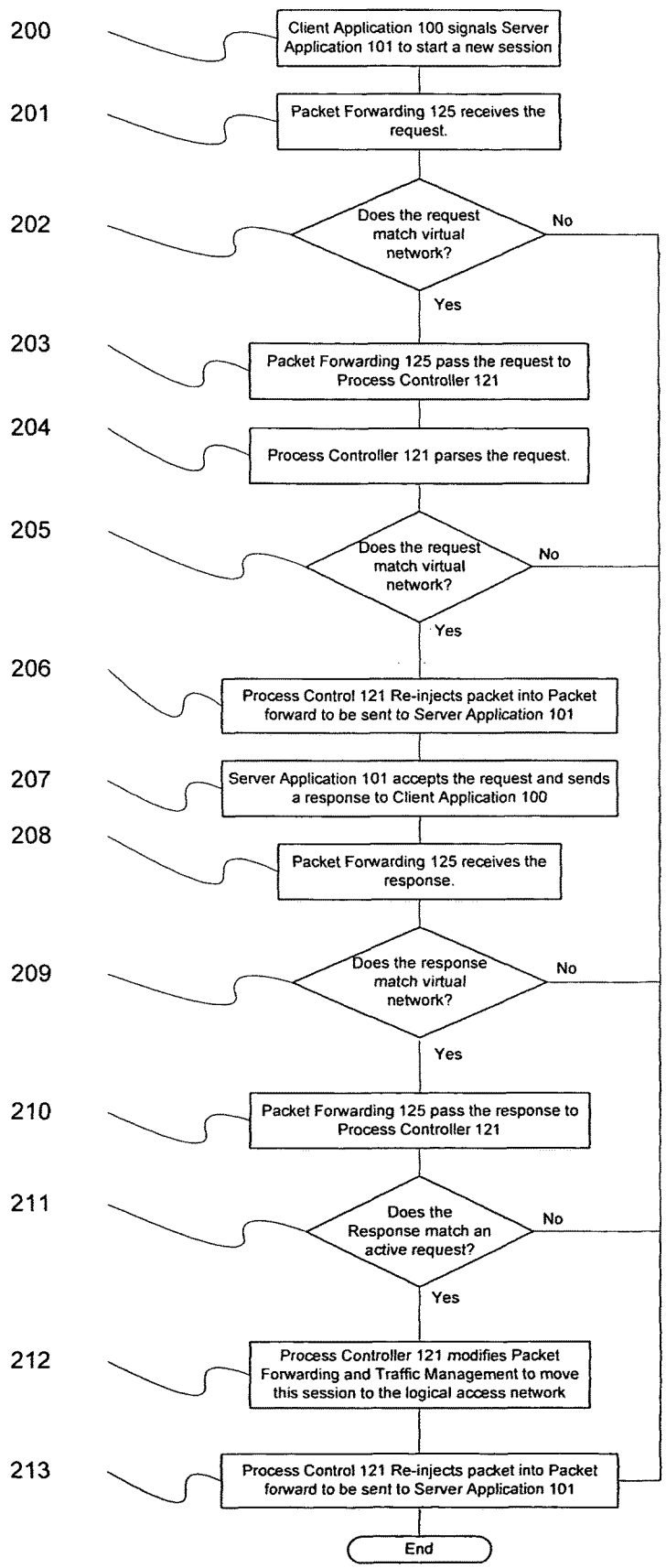
FIG. 15 is a diagram of one implementation of a bandwidth renegotiation with real-time handling of client requests.

Now that the LAN is enabled, the real-time handling of the client application request is effected as depicted in FIG. 15. This process affects the behavior of the switch 120 based upon service signaling. The client application signals the server application 101 to start a new session at 200. This packet arrives in the switch 120 via the client link 140 and is processed by the dataplane. The packet forwarding bloc classifies the packet and sees that the packet matches the virtual LAN at 201 and 202. The request is forwarded to the process controller which identifies the packet as a request for the new virtual LAN at 203, 204 and 205. This request is forwarded to server application 101 via the access network 150 at 206. The request is accepted and the response is forwarded back to the client application 100 via the access network 150 at 207. When the response arrives back at the switch 120, the packet forwarding block identifies the packet and forwards to the process controller 121 at 209 and 210. The process controller 121 notices that the client applications request has been accepted by the server application 101, and changes are provisioned in traffic management 126 at 206 and the packet forwarding block at 211 and 212. Then the response is forwarded to the client application 100 at 213.

Sub-Classes for Ethernet QoS

Once end-to-end flow control has been enabled and a traffic admission mechanism is implemented to provide per customer SLA handling, the system provides for differentiation within a class of service (CoS). Differentiation can be applied by providing different levels of loss or delay to different connections.

One method to differentiate SLAs with a particular class of service is to provision a flow control handling policy. This policy can be unique for every path providing different handling at each level of congestion of flow control. The flexibility makes traffic engineering more difficult. To address this, the policies can be defined as templates to reduce the complexity and limit the amount of system resources needed to store and implement these policies.

Alternatively, different levels of service within a service class can be implemented by triggering the flow control to connections proportional to a service weight. Therefore, upon flow control notification from the network, a connection with a larger weight reduces its transmission rate faster than a connection with a lower weight. When the flow control allows the connection to increase the weights, the connection with the larger weight increases its transmission rate more slowly than the one with the smaller weight Alternatively, it can be implemented such that a connection with a smaller weight reduces its transmission rate faster than a connection with a higher weight. The use of a weight allows differentiating connections with the same traffic descriptors.

Another implementation, which does not require the use of an additional weight parameter, decreases and increases the transmission rate in proportion to the existing traffic descriptors, i.e., the weight is calculated as a function of CIR and EIR. For example, a weight for connection i could be calculated as follows:

$$W_i = (EIR_i - CIR_i)/AccesslinkRate_i$$

Using such weight calculation, the connections that have the lower CIR have a lower service weights and therefore trigger the flow control more aggressively. It is assumed in this example that such connections pay a lower fee for their service.

Instead of using weights to define how flow control messages are handled, the nodes could randomly choose which connections to send flow control information to (to increase or decrease the rate) and use the service weights to increase or decrease the probability that a given type of connection receives a flow control message. This characterization can be implemented in several ways, such as, for example, having the nodes agnostic to the sub-class differentiation and triggering backoff messages to all the connections, but the connections would react according to their sub-class's policy. Another way is to have the nodes knowledgeable of the subclass differentiation and trigger the flow control based on each connection's policies. That implementation requires more information on a per connection basis at the node, along with multiple flow control triggers, but the nodal behavior is more predictable.

These mechanisms allow a carrier to deploy many different types of sub-classes within one service type and charge different customers based on the preferential treatment their connections are receiving.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

What is claimed is:

1. A method of controlling the flow of data-packet traffic through an Ethernet telecommunications network having a multiplicity of nodes interconnected by multiple network links, comprising receiving incoming Ethernet data-packet traffic from multiple customer connections at a first node of said multiplicity of nodes for entry into the network via said first node, obtaining Ethernet flow control messages each representing a state of said first node or one or more nodes of said multiplicity of nodes upstream from said first node, and using the state represented in each of said Ethernet flow control messages as factors in controlling the rate at which Excess Information Rate (EIR) traffic of said incoming Ethernet data-packet traffic is admitted to the network at said first node, wherein said controlling is based on a technique used to generate the Ethernet flow control messages with a step up in the rate being linear and a step down in the rate being exponential, wherein the step up and the step down are proportional to prescribed Ethernet traffic descriptors, wherein said multiplicity of nodes in said network comprise queues for said Ethernet data-packet traffic being transmitted through respective nodes, and each of said multiplicity of nodes with queues generates said Ethernet flow control messages and transmits such messages to downstream nodes, wherein the Ethernet flow control messages comprise indications of which of a plurality thresholds are reached in said queues and the Ethernet flow control messages are used to shape the Ethernet data-packet traffic without stopping transmission of Ethernet data-packets, and wherein said Ethernet flow control messages are selectively transmitted from said multiplicity of nodes directly in a backward path via hairpin connections at said multiplicity of nodes.

2. The method of claim 1 wherein at least one of said Ethernet flow control messages are received at said first node from nodes upstream of said first node.

3. The method of claim 1 further comprising:

receiving transit traffic at said first node, from one or more other nodes of said network, and using said Ethernet flow control messages to control the rate at which said transit traffic is transmitted to said first node.

4. The method of claim 3 wherein said transit traffic received at said first node is assigned a higher transmission priority than the incoming traffic to be admitted to the network at said first node.

5. The method of claim 1 wherein the controlling the rate is performed by said first node.

6. The method of claim 3 wherein any reduction in the rate at which data packets are transmitted from said first node is greater for entering traffic than for said transit traffic.

7. The method of claim 1 wherein any node in a path manages the state information received for all upstream nodes, and sends state information representing only the worst congestion downstream for use in the controlling the rate.

8. The method of claim 1 wherein
said factors are based on the most congested state indicated by the flow control messages from any upstream node and said first node.

9. The method of claim 1 further comprising setting threshold levels at which the rate of transmission of said Ethernet data-packet traffic to a prescribed node is to be increased or decreased, and generating flow control messages when said threshold levels are reached.

10. The method of claim 1 further comprising aggregating traffic from multiple customer connections and using the state of such aggregation as a factor in controlling the rate at which said incoming Ethernet data-packet traffic are admitted to the network.

11. The method of claim 1 wherein the rate at which said incoming Ethernet data-packet traffic are admitted to the network is controlled by traffic shaping which buffers incoming packets and admits the buffered packets into the network at a rate that changes according to parameters that include a contracted rate of transmission and the congestion state of the network.

12. The method of claim 1 wherein the rate at which said incoming Ethernet data-packet traffic are admitted to the network is controlled by a policing mechanism that takes into account a contracted rate of transmission and the congestion state of the network.

13. The method of claim 1 further comprising throttling said incoming Ethernet data-packet traffic as a function of the congestion of the network at said first node and upstream of said first node.

14. The method of claim 1 wherein the rate at which said incoming Ethernet data-packet traffic are admitted to the network satisfies a minimum requirement for an application generating said incoming packets.

15. The method of claim 1 further comprising monitoring the Ethernet data-packet traffic received at said first node from each customer connection, and separately controlling the rate at which the Ethernet data-packet traffic from each customer connection are admitted to the network.

16. The method of claim 15 wherein said monitoring and controlling are effected by a traffic shaper.

17. The method of claim 15 further comprising intermediate queues in which an intermediate queue aggregates data packets received from multiple customer connections, and using the state of such aggregation as a factor in controlling the rate at which said data packets are admitted to the network.

18. The method of claim 17 further comprising setting threshold levels, representing the number of data packets in said intermediate queues, at which the rate of transmission of said data packets in said intermediate queues to a prescribed node is to be increased or decreased, and generating flow control messages when said threshold levels are reached.

19. The method of claim 1 wherein upstream nodes are the nodes where the traffic in the queues that cause the flow control messages to be generated, enters the network.

20. The method of claim 1 wherein contracted bandwidth corresponds to a prescribed quality of service, and the contracted bandwidth is increased or decreased by changing a contracted quality of service.

21. The method of claim 20 wherein said contracted bandwidth is adjusted based on time-of-day, time-of-year behavior.

22. The method of claim 20 wherein said contracted bandwidth is adjusted based on user signaling.

23. The method of claim 1, where the controlling the rate comprises reducing a rate at which Excess Information Rate (EIR) traffic is admitted based upon said flow control messages.

24. A method, comprising
receiving incoming Ethernet traffic at a node in an Ethernet network, wherein the incoming traffic enters the Ethernet network at the node,
generating Ethernet flow control messages at each of a plurality of nodes in the Ethernet network, wherein the Ethernet flow control messages comprise status of the nodes and queues disposed within the nodes and comprise indications of which of a plurality thresholds are reached in said queues and the Ethernet flow control messages are used to shape the Ethernet traffic without stopping transmission of Ethernet data-packets,
exchanging the Ethernet flow control messages over the Ethernet network, wherein the Ethernet flow control messages are selectively sent directly in a backward path of the Ethernet network to downstream nodes via hairpin connections at each of the nodes and the Ethernet flow control messages are sent at a highest priority, and
based on the Ethernet control messages, adjusting a rate at which a portion of the incoming traffic is admitted to the Ethernet network at the node, wherein the portion comprises Excess Information Rate (EIR) traffic, and wherein said adjusting is based on said Ethernet flow control messages with a step up in the rate being linear and a step down in the rate being exponential, wherein the step up and the step down are proportional to prescribed Ethernet traffic descriptors.

25. An Ethernet network, comprising
a first switch,
a second switch,
an upstream path of Ethernet packets connecting the first switch to the second switch,
a downstream path of Ethernet packets connecting the second switch to the first switch,
a first hairpin connection at the first switch selectively coupling the downstream path to the upstream path, and
a second hairpin connection at the second switch selectively coupling the upstream path to the downstream path,
wherein each of the first switch and the second switch are configured to
generate Ethernet flow control messages comprising node status and status of queues disposed therein and comprising indications of which of a plurality thresholds are reached in said queues and the Ethernet flow control messages are used to shape the Ethernet data-packet traffic without stopping transmission of Ethernet data-packets,
selectively send the Ethernet flow control messages at a highest priority directly in a backward direction via either the first hairpin connection or the second hairpin connection, and based on the Ethernet flow control messages, adjust a rate in which a portion of the incoming traffic is admitted to the Ethernet network, wherein the portion comprises Excess Information Rate (EIR) traffic, and wherein said adjusting is based on said Ethernet flow control messages with a step up in the rate being linear and a step down in the rate being exponential, wherein the step up and the step down are proportional to prescribed Ethernet traffic descriptors.

26. The Ethernet network of claim 25, wherein the first hairpin connection and the second hairpin connection are used for control messaging to minimize delay before flow control information reaches a traffic admission mechanism.

27. The Ethernet network of claim 25, wherein the Ethernet flow control messages comprise indications of different levels of congestion, providing information about the state of a given queuing point.

28. The Ethernet network of claim 27, wherein the Ethernet flow control messages are generated when packets are being discarded for a given connection.

29. The method of claim 24, wherein the hairpin connections are used for control messaging to minimize delay before flow control information reaches a traffic admission mechanism.

30. The method of claim 24, wherein the Ethernet flow control messages comprise indications of different levels of congestion, providing information about the state of a given queuing point.

31. The method of claim 24, wherein the Ethernet flow control messages are generated when packets are being discarded for a given connection.

32. The method of claim 1, wherein the hairpin connections are used for control messaging to minimize delay before flow control information reaches a traffic admission mechanism.

33. The method of claim 1, wherein the Ethernet flow control messages comprise indications of different levels of congestion, providing information about the state of a given queuing point.

34. The method of claim 33, wherein the Ethernet flow control messages are generated when packets are being discarded for a given connection.

35. The method of claim 1, wherein a new connection starts at a minimum rate of a Committed Information Rate (CIR) and increases until reaching an EIR of the new connection or until receiving the Ethernet flow control messages, and in response to the Ethernet flow control messages, the new connection operates responsive to the Ethernet flow control messages.

36. The method of claim 1, wherein a new connection starts at a maximum rate of an EIR of the new connection until receiving the Ethernet flow control messages, and in response to the Ethernet flow control messages, the new connection operates responsive to the Ethernet flow control messages.

37. The method of claim 1, wherein a new connection starts at a minimum rate of a Committed Information Rate (CIR) and, responsive to receiving the Ethernet flow control messages from the one or more node, operates responsive to the Ethernet flow control messages.

38. The method of claim 1, wherein the rate at which said incoming Ethernet data-packet traffic are admitted to the network is controlled by traffic shaping, using the Ethernet flow control messages, and using different congestion control actions based on a deep packet inspection device placed upstream from the traffic shaper, which identifies different types of traffic in the Ethernet data-packet traffic.

39. The method of claim 24, wherein a new connection starts at a minimum rate of a Committed Information Rate (CIR) and increases until reaching an EIR of the new connection or until receiving the Ethernet flow control messages, and in response to the Ethernet flow control messages, the new connection operates responsive to the Ethernet flow control messages.

40. The method of claim 24, wherein a new connection starts at a maximum rate of an EIR of the new connection until receiving the Ethernet flow control messages, and in response to the Ethernet flow control messages, the new connection operates responsive to the Ethernet flow control messages.

41. The method of claim 24, wherein a new connection starts at a minimum rate of a Committed Information Rate (CIR) and, responsive to receiving the Ethernet flow control messages from the one or more node, operates responsive to the Ethernet flow control messages.

42. The network of claim 25, wherein a new connection starts at a minimum rate of a Committed Information Rate (CIR) and increases until reaching an EIR of the new connection or until receiving the Ethernet flow control messages, and in response to the Ethernet flow control messages, the new connection operates responsive to the Ethernet flow control messages.

43. The network of claim 25, wherein a new connection starts at a maximum rate of an EIR of the new connection until receiving the Ethernet flow control messages, and in response to the Ethernet flow control messages, the new connection operates responsive to the Ethernet flow control messages.

44. The network of claim 25, wherein a new connection starts at a minimum rate of a Committed Information Rate (CIR) and, responsive to receiving the Ethernet flow control messages from the one or more node, operates responsive to the Ethernet flow control messages.

\* \* \* \* \*